Sept. 6, 1932. M. HELLAND 1,875,601
CUP CAKE DROPPING MACHINE
Filed Aug. 8, 1931 2 Sheets-Sheet 1

Inventor,
Martin Helland,
By Geo. W. Bullard,
Attorney.

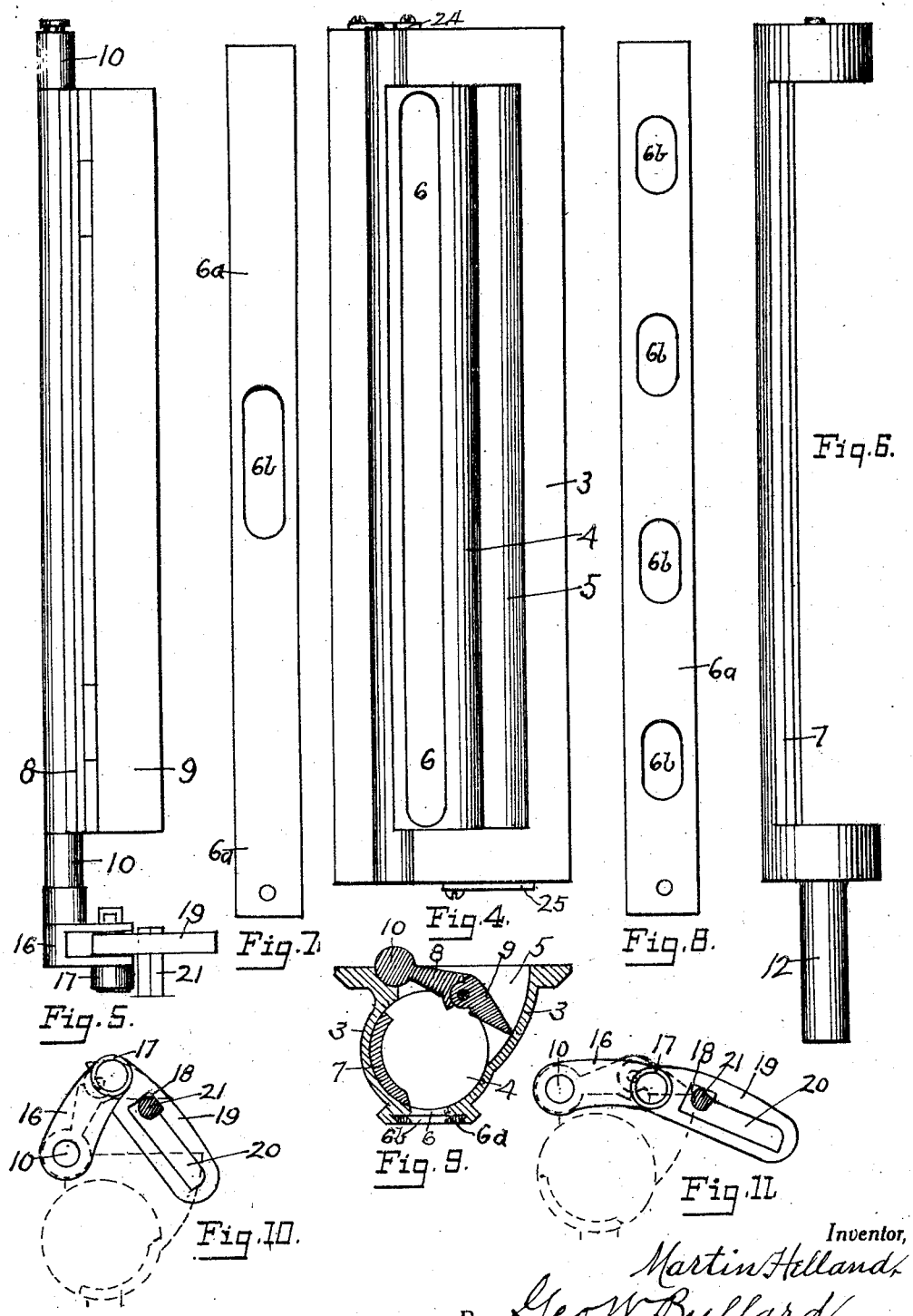

Patented Sept. 6, 1932

1,875,601

UNITED STATES PATENT OFFICE

MARTIN HELLAND, OF SEATTLE, WASHINGTON

CUP-CAKE DROPPING MACHINE

Application filed August 8, 1931. Serial No. 555,967.

My invention pertains to improvements on my original invention of improvements in cup-cake dropping machines, for which on January 18, 1930, I filed an application for patent in the United States Patent Office the serial number being 421,847, and the same being allowed April 2, 1931.

My invention also pertains to improvements on my original invention invented by Ernest A. Adams, for which an application for letters patent in the United States was filed in the Patent Office on October 31, 1930, the serial number being 492,566.

The primary objects of my invention remain the same as in my original invention. A special object of the present invention is to simplify the operative mechanism of the Adams' improvements, by my newly invented improvements hereinafter shown and described, the operative segmental gears being eliminated; the operative block with its side member fixed thereto, the pivotally attached dog and segmental slotted member, being replaced by more simple and practical means for operating the double hinged valve gate and the cylindrical cutting device.

A further object of my invention is to simplify the cylindrical measuring and cutting device of my original invention by eliminating the dividing partitions therein and thus substituting one elongated receiving, measuring and discharging chamber. By these and other improvements, the construction of the cup-cake dropping machine is greatly simplified, its operation rendered more easy and accurate and the cost of manufacture greatly reduced.

I attain these objects by means of the mechanism illustrated in the accompanying drawings, in which:—

Fig. 4 is a top view of the detached receiving and discharging chamber in which the double hinged valve gate and cylindrical cutting device operate, all partitions being removed making one elongated chamber extending the full length of the dough bowl;

Fig. 5 is a top view of the double hinged valve gate in a lifted position preparatory to filling the receiving and measuring chamber;

Fig. 6 is a top view of the cylindrical cutting device with the partitions eliminated;

Fig. 7 is a top view of a detached outlet member with one discharge outlet;

Fig. 8 is a view similar to Fig. 7 showing four discharge outlets;

Fig. 9 is a vertical cross section through the receiving and discharging chamber, the valve gate and cutting device being shown in position to correspond with the operating mechanism as shown in Fig. 1;

Fig. 10 is a view of the gate operating mechanism when the gate or valve is lifted preparatory to filling the receiving and discharging chamber; and Fig. 11 is a similar view with the gate closed and at rest while the discharge outlets are being opened.

Similar characters designate similar parts in the several views and are used to designate like parts as far as possible in the original and in the Adams' inventions heretofore cited.

Figure 1:
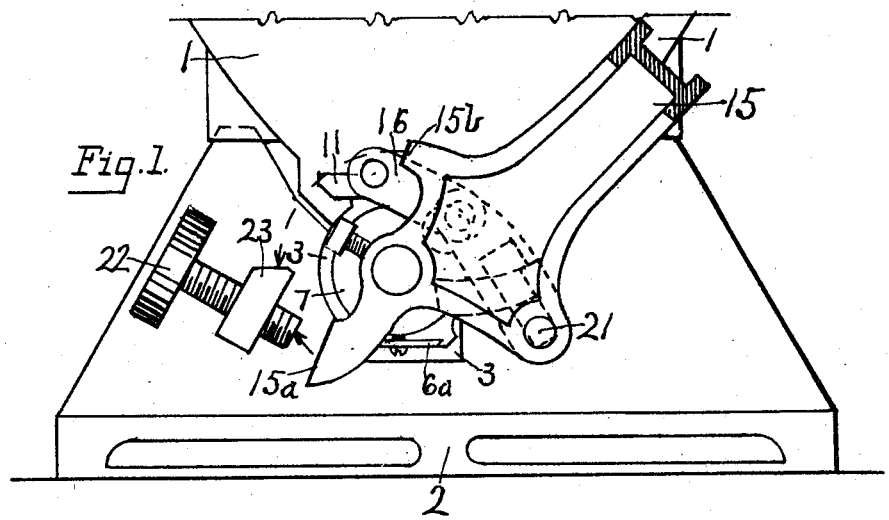
Figure 1 is an external view of my improvement at the point of operation when a set of cup-cake pans are being filled.
Figure 2:
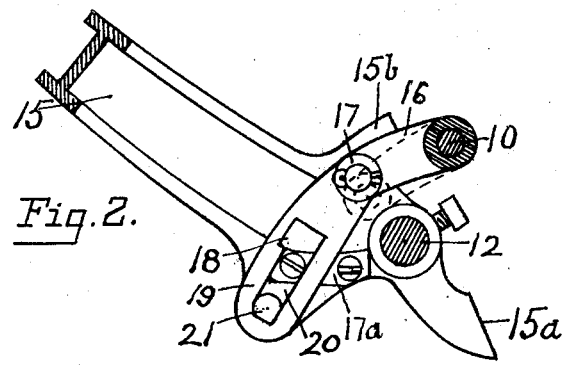
Fig. 2 is a sectional view on the line 2—2 in Fig. 3, looking in the direction of the arrows.
Figure 3:
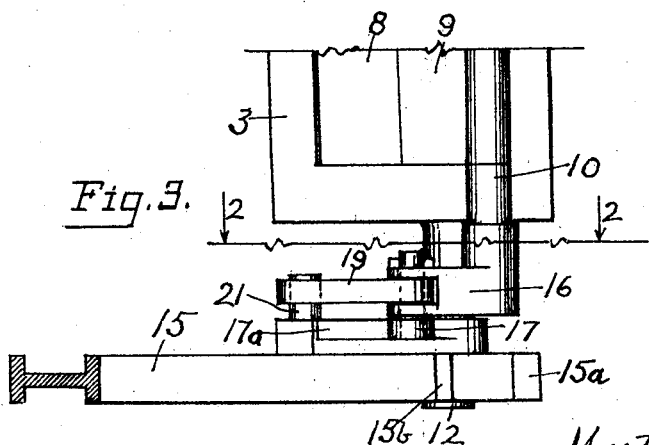
Fig. 3 is a top view of the mechanism as shown in Fig. 2.

Referring to the drawings it will be seen in Fig. 1 that my improvements are designed to be attached to the bottom of any form of dough container partly shown at 1, the same being supported on a base 2 as in my original invention. The special improvement to my original invention is in the cylindrical measuring and cutting device which is operated within the detachable valve chamber 3, similar to the Adams improvement. Instead of a plurality of valves in the cylindrical cutting device, I substitute one valve the full length of the valve chamber opening 5 as shown in Figs. 4 and 6. Instead of a plurality of fixed discharge ports or openings in the bottom of the valve chamber, I provide one opening 6 the full length thereof. Beneath this opening I insert a discharge port member 6a slidably dove-tailed into the bottom of the valve chamber and the full length thereof. I have designed to use a plurality of these members to be inserted and withdrawn as the varied uses may require. One of the members 6a is to have a large discharge outlet 6b at its center as shown in Fig. 7, for dropping loaf cakes. Another of said members is to have two outlets for layer cakes, and so on up to four or more smaller outlets 6b as shown in Fig. 8 for dropping cup-cakes, wafers and other smaller sweets of any desired size.

The double hinged valve gate 8—9 shown in Fig. 5 is the same as in the Adams improvement, but is made in one section to fit and operate within the one valve chamber of the cylindrical cutting device 7. By referring to Fig. 9, it will be seen that the axis of this valve gate is mounted in line with the top plane of the valve chamber 3. It can thus be set into the valve chamber 3 and with it be slipped into place beneath the dough container 1. When the chamber is detached from the dough container, the several parts can be separated as shown in Figs. 4 to 8 and each be washed after using.

The valve chamber 3, gate 8—9, cutting device 7 and detachable dove-tailed members 6a fit the invention for a more varied field of usefulness than my original invention.

My improvement over the Adams invention lies in the hand crank operating mechanism. The hand crank 15 is fixed directly on the shaft 12 of the cylindrical cutting device 7, thereby eliminating the two segmental gears of the Adams improvement. The double hinged gate valve 8—9 is operated by a fixed stud 21 extending from the inner side of the hand crank 15. This stud engages the slot 20 in the link member 19 which is pivotally attached to the lever arm 16 fixed on the hinge shaft 10 of the valve gate 8—9. At the pivotal connection of the link 19 and the lever arm 16 is mounted a small roller 17 designed to travel on a short curved track 17a fixed on the inner side of the hand crank 15.

In discharging dough from the valve chamber 3 the crank 15 is pushed to the right until the stop extension 15a contacts the adjustable stop screw 22 thus completing the discharge from the valve chamber. The hand crank 15 is then drawn to the left until the stop extension 15b contacts the top of the screw stub 23. From the beginning of this left movement of the crank 15, the stud 21 will idle up in the slot 20 to the top of the same, leaving the valve gate 8—9 stationary while the cylindrical cutting device 7 is cutting off the dough and closing the discharge port 6. At this point the small roller 17 contacts the short curved track 17a on which it is carried with the two pivotally connected members 16 and 19 up to the position shown in Fig. 10. The double hinged valve gate is now lifted to admit a new supply of dough into the valve chamber 3.

It is now to be observed that the slot 20 has a square cornered extension 18 at its upper end and side and that the stud 21 is cut to a square on one side to fit into and engage the square cornered extension 18. The hand crank 15 is now pushed to the right and the stud 21 will pull the pivotally connected members 16 and 19 to the position shown in Fig. 11 and the valve chamber 3 is now closed by the valve gate 8—9. At this point the stud 21 has turned out of engagement with the square cornered extension 18 and will idle down the slot 20 leaving the valve gate 8—9 stationary at the top of the valve chamber 3 and while the discharge port 6 is being opened. On contacting the lower end of the slot 20 the stud 21 completes the downward movement as indicated in Figs. 1 and 9. Thus by the right and left hand movement of the hand crank 15 the improved cup-cake dropping machine can be operated indefinitely.

It is to be observed that with these new improvements the construction and operation of the several parts on my original invention have been simplified and the operating parts of the Adams improvements have been made less complicated, and more ease and accuracy in operation has been attained. By means of the detachable discharge port members 6a, the machine can be used for making a wide variety of loaf cakes, cup-cakes and wafer products. By means of the adjustable screw 22, the size and weight of each article can be pre-determined to a nicety.

It is to be further observed that with these improvements as shown and described, the several parts can be fitted and assembled more easily than in my original invention and certain economy will result in the manufacture of the machine.

The bowl 1 and base 2 are of cast aluminum. The valve chamber and cutting device are of brass and the operating parts are of hardened steel, each of the said parts milled to fit neatly and work to a nicety. The valve chamber is held in place under the bowl by means of set screws not shown on the drawings. The valve gate is held in perfect adjustment by means of a fixed collar plate 24 on the end of the valve chamber. This collar plate extends partly over the end of the cylindrical cutting device and with a pivotal key plate 25 on the opposite end, holds the cutting device in operative position.

Having described my invention, I claim:

1. A cup-cake dropping machine including a dough container having an outlet, a valve container covering said outlet and having an outlet, a removable plate on the valve container beneath the outlet thereof having openings therein, a chambered oscillatory valve and dough cutting member in the valve container for opening and closing said outlet openings, a hinged double valve-gate operated to fill the chamber of said valve and provide the pressure to discharge the dough therefrom, a crank handle on an end of the cutting member, a link on said valve gate, a slotted link pivotally carried by the first link, and operating connections between the slotted link and the crank handle.

2. A cup-cake dropping machine including a valve container detachably suspended below a bottom outlet from a dough container, a valve gate supporting shaft in the container, an oscillatory valve gate on the shaft, a cutter shaft in the valve container, a cylindrical cutting device on the cutter shaft, a discharge outlet in the bottom of said valve container, a crank handle for rotating said cutting device, link means on the shaft of said valve gate, and means on said crank handle engaged with said link means for operating said valve gate in relation to the opening and closing of said discharge outlet by said cutting device.

3. A cup-cake dropping machine including a dough container having an outlet, a valve container mounted on the dough container in position to receive from the said outlet and having discharge openings, a cutter shaft in the valve container, a combined dough cutter and closure for said discharge openings mounted on said shaft, operating means on the shaft of said cutter, a valve gate supporting shaft, a hinged double valve gate on the valve gate shaft for filling the valve container from the dough container and for providing the pressure to discharge from the latter, a link on the shaft of said valve gate, a link pivoted on the first link having a longitudinal slot, said slot having a lateral recess at one end, and a pin on said cutter operating means engaged in said slot for operating said links upon movement of said means in one direction to move said valve gate into the dough container and to close the outlet of the valve container, and to move the said valve gate to fill the valve container and open said outlet of the valve container, upon movement in the opposite direction.

MARTIN HELLAND.